United States Patent [19]
Yamamoto

[11] Patent Number: 5,668,832
[45] Date of Patent: Sep. 16, 1997

[54] AUTOMATIC EQUALIZER FOR REMOVING INTER-CODE INTERFERENCE WITH FADING AND METHOD OF CONTROLLING TAP COEFFICIENTS THEREOF

[75] Inventor: Takeshi Yamamoto, Tokyo, Japan

[73] Assignee: NEC Corporation, Japan

[21] Appl. No.: 411,537

[22] Filed: Mar. 28, 1995

[30] Foreign Application Priority Data

Mar. 28, 1994 [JP] Japan .................................. 6-057589

[51] Int. Cl.$^6$ .................................................. H03H 7/30
[52] U.S. Cl. ...................... 375/233; 375/350; 364/724.2; 333/18
[58] Field of Search ...................... 375/343, 346, 375/348, 232, 233, 230, 266, 340, 350, 285, 229, 231; 364/724.2, 724.01, 724.11, 724.16, 724.19; 329/310, 349, 351; 327/261; 333/18, 28 R

[56] References Cited

U.S. PATENT DOCUMENTS

| | | | |
|---|---|---|---|
| 5,230,006 | 7/1993 | Kurokami | 375/232 |
| 5,241,320 | 8/1993 | Mizoguchi | 342/362 |
| 5,321,723 | 6/1994 | Mizoguchi | 375/233 |
| 5,353,306 | 10/1994 | Yamamoto | 375/233 |
| 5,369,668 | 11/1994 | Yamamoto | 375/233 |
| 5,394,110 | 2/1995 | Mizoguchi | 329/304 |
| 5,418,816 | 5/1995 | Yamamoto | 375/230 |

FOREIGN PATENT DOCUMENTS 477106   3/1992   Japan .

*Primary Examiner*—Wellington Chin
*Assistant Examiner*—William Luther
*Attorney, Agent, or Firm*—Ostrolenk, Faber, Gerb & Soffen LLP

[57] ABSTRACT

An automatic equalizer comprises an adaptive matched filter (AMF) and a decision feedback equalizer (DFE), which is designed to stop operation of minus taps of the AMF while a demodulator is in synchronous status and to enable the minus taps of the AMF while it is in asynchronous status.

4 Claims, 6 Drawing Sheets

$\rho > 1$ $\rho < 1$ $\rho > 1$ $\rho < 1$

AUTOMATIC EQUALIZER FOR REMOVING INTER-CODE INTERFERENCE WITH FADING AND METHOD OF CONTROLLING TAP COEFFICIENTS THEREOF

BACKGROUND OF THE INVENTION

The present invention relates to an automatic equalizer used for a digital radio communication system, especially to an automatic equalizer comprising an adaptive matched filter and a decision feedback equalizer to remove an intersymbol interference due to radio channel fading and a method for controlling tap coefficients used therein.

A conventional digital radio communication system has been so proposed to combine an adaptive matched filter (AMF) and a decision feedback equalizer (DFE) at a receiver side to compensate degradation of the channel quality due to frequency selective fading environment generated on a propagation path (See Paper No.B-929, Spring National Convention of Electronic Information Communication Society, 1989).

Supposing that an amplitude ratio of a reflected (delayed) wave to a direct (preceding) wave is $\rho$, the DFE unity capable of equalizing two wave interference under fading functions in equalizing the intersymbol interference completely in case of $\rho<1$. While in case of $\rho>1$, its performance is deteriorated, implying that the equalization characteristic is degraded when the amplitude of the delayed wave becomes larger than that of the preceding wave (See Chapter 6 of "Digital radio communication" written by Muroya and Yamamoto, published by Sangyo Tosho).

In order to improve the equalization characteristic in $\rho>1$, it has been proposed to place the AMF ahead of the DFE.

FIG. 4 is a first block diagram of a conventional automatic equalizer. A reference numeral 1 is an A/D converter. Reference numerals 2 and 3 are delay circuits which delay a symbol space by T. Reference numerals 4 to 6 are multipliers. Reference numeral 7 is an adder, 8 to 10 are correlators, 11 to 13 are integrators, 101 is a demodulator, 201 is a transversal filter, and 301 is a decision feedback equalizer (DFE).

The adaptive matched filter of a T space 3 tap type is composed of the transversal filter 201, the correlators 8 to 10, and the integrators 11 to 13.

The operation of the automatic equalizer of this type is hereinafter described.

The demodulator 101 demodulates a received signal, and a demodulated signal is sample-quantized by the A/D converter 1. The sample-quantized digital signal string output from the A/D converter 1 is input to the transversal filter 201, then delayed by the delay circuits 2 and 3 sequentially. An input signals of the transversal filter 201 and output signals of the delay circuits 2 and 3 are respectively input to the multipliers 4 to 6 where they are multiplied by tap coefficients $A_{-1}$, $A_0$, and $A_{+1}$, respectively. Outputs of the multipliers 4 to 6 are added through the adder 7. The output of the adder 7 is input to the DFE 301 where the intersymbol interference is equalized and decided.

A decision signal 104 output from the DFE 301 is input to the correlators 8 to 10 where the decision signal 104, the input signal of the transversal filter 201 and output signals of the delay circuits 2 and 3 are correlated. The respective mean values of outputs of the correlators 8 to 10 are obtained through the integrators 11 to 13 to define new tap coefficients $A_{-1}$, $A_0$, and $A_{+1}$ of the transversal filter 201.

Convolution of those tap coefficients and received signals provides outputs of the adaptive matched filter (AMF) corresponding to the impulse response on the propagation path. FIG. 6 shows waveforms of the output response in case of $\rho>1$. FIG. 7 shows waveforms of the output response in case of $\rho<1$.

The adaptive matched filter (AMF) serves to disperse the interference wave component due to frequency selective fading generated on the propagation path ahead and behind the main wave component, respectively as shown by FIGS. 6 and 7.

In case of $\rho>1$, i.e., the amplitude of the delayed wave is larger than that of the preceding wave, the AMF enables the preceding wave as the interference component to be dispersed ahead and behind the main wave. With this mechanism, the interference wave component preceding the main wave that is difficult to be equalized by the DFE located behind the AMF is converted into that behind the main wave, thus the equalization characteristic of this case can be improved.

In case of $\rho<1$, however, the construction of the first example of the conventional automatic equalizer generates the interference wave component preceding the main wave as FIG. 7 shows. Accordingly the equalization characteristic is degraded compared with the construction using the DFE unity only.

Aiming at overcoming the aforementioned degradation, another type of the equalizer has been proposed in Japanese Patent Laid-Open No.77106(1992). It is so constructed to operate the DFE unity only by suspending the AMF in case of $\rho<1$. While in case of $\rho>1$, the AMF and DFE are operated together. The operation of the AMF is suspended by fixing the tap coefficients of FIG. 5 to initial values $A_0=1$, $A_{-1}=A_{+1}=0$ (The DFE unit only). This mechanism is realized by adding a control circuit for controlling those tap coefficients to the construction shown by FIG. 4.

FIG. 5 is a block diagram of a second conventional automatic equalizer. The same construction items as those shown by FIG. 4 have the same reference numerals, thus omitting their explanations.

Referring to FIG. 5, reference numerals 30 and 31 are multipliers, 32 is a control signal generator, and 402 is a control circuit.

The control signal generator 32 monitors outputs of the integrators 11 to 13 which represent impulse responses on the propagation path to determine the status thereof.

If the propagation path status is determined as $\rho>1$, the control signal generator 32 outputs 1 to multipliers 30 and 31, respectively to operate the AMF and DFE in the same manner as described in the first example of a conventional automatic equalizer. While if determined as $\rho<1$, it gradually decreases the value output to the multipliers 30 and 31 to 0 so as to operate the DFE unity only.

In this case, the AMF generates outputs without diverging the interference wave as shown in FIGS. 8 and 9.

Adding the control circuit 402 provides higher equalization characteristic with the automatic equalizer compared with the first example on the propagation path status in case of both $\rho>1$ and $\rho<1$.

When using this equalizer as the second example, in case the propagation path is determined as $\rho<1$ and the interference wave component becomes excessively large, it no longer performs its equalization characteristic appropriately, which causes output signals to be dispersed. In this case, the closer $\rho$ approaches the value 1, the more difficult it becomes to perform pull-in operation, i.e., converging the location of output signals of the equalizer.

If the propagation path is determined as $\rho<1$, the AMF is reset (suspended) and DFE unity is only operated. So the interference wave component is not dispersed by the AMF, requiring some DFE taps to have substantially a great value.

When the propagation path status is in the vicinity of $\rho=1$, it may be further difficult to perform pull-in operation due to additional AMF reset control.

In the first example of the prior art of FIG. 4, the AMF disperses the interference wave component to require no great value of tap coefficient for the respective DFE taps even if the communication path status is in the vicinity of $\rho=1$, resulting in easy pull-in operation.

In this case, however, as aforementioned, the equalization characteristic is degraded during pull-in status.

SUMMARY OF THE INVENTION

It is an object of the present invention to provide an automatic equalizer with excellent equalization characteristic to improve the pull-in operation of the control loop under fading for providing the solution to the aforementioned problem.

The aforementioned object is realized by providing an automatic equalizer comprising a demodulator for outputting a detection signal which indicates synchronous status as well as demodulating analog base band signals from received signals, an A/D converter for outputting a first digital signal string by sample-quantizing the analog base band signals, an adaptive matched filter for outputting a second digital signal string by converting the first digital signal string, a decision feedback equalizer for outputting a decision signal by equalizing intersymbol interferences in the second digital signal string, a correlator for correlating the decision signal with a signal on each tap of the adaptive matched filter, an integrator for averaging outputs of the correlator, and a control means for outputting each tap coefficient of the adaptive matched filter derived from multiplying an output of the integrator by a weighting coefficient based on the detection signal.

The principle of the automatic equalizer of the present invention is described below. When the propagation path status is determined as $\rho>1$, the interference wave precedes the main wave, so the tap in the plus side (hereinafter referred to as "plus tap(s)")(more remotely from the input than the center tap) is correlated. At this time the tap in the minus side (hereinafter referred to as "minus tap(s)") (closer to the input than the center tap) is hardly correlated.

When the propagation path status is determined as $\rho<1$, the interference wave is behind the main wave, so the minus tap among the AMF taps is correlated to increase the value of its tap coefficient. At this time the plus tap is hardly correlated.

The operation of the AMF minus tap is reset when the control is loop pulled-in, i.e., the demodulator is in synchronous status. In this case, the interference wave component is symmetrically dispersed through the AMF plus tap in case of $\rho>1$. While in case of $\rho<1$, the AMF outputs almost the same signals as input signals.

Similar to the case shown by FIGS. 8 and 9, therefore, in case of $\rho>1$, the AMF improves the equalization characteristic, while in case of $\rho<1$, the same equalization characteristic as that of the DFE unity can be obtained.

When the control loop is divergent, i.e., the modulator is in asynchronous status, all taps of the AMF are enabled to improve the pull-in property. Once the control loop has been pulled-in, the AMF minus tap coefficient is gradually decreased at a rate lower than the tracking rate of DFE control. The operation of the AMF is, thus, suspended to enter into normal equalization.

The AMF minus tap becomes active only in the repulling-in process after the control loop has diverged. Then the AMF operation is suspended so as to facilitate pull-in operation for the automatic equalizer.

BRIEF DESCRIPTION OF THE DRAWINGS.

This and other objects, features and advantages of the present invention will become more apparent upon a reading of the following detailed description and drawings, in which.

DESCRIPTION OF THE PREFERRED EMBODIMENTS

Figure 1:
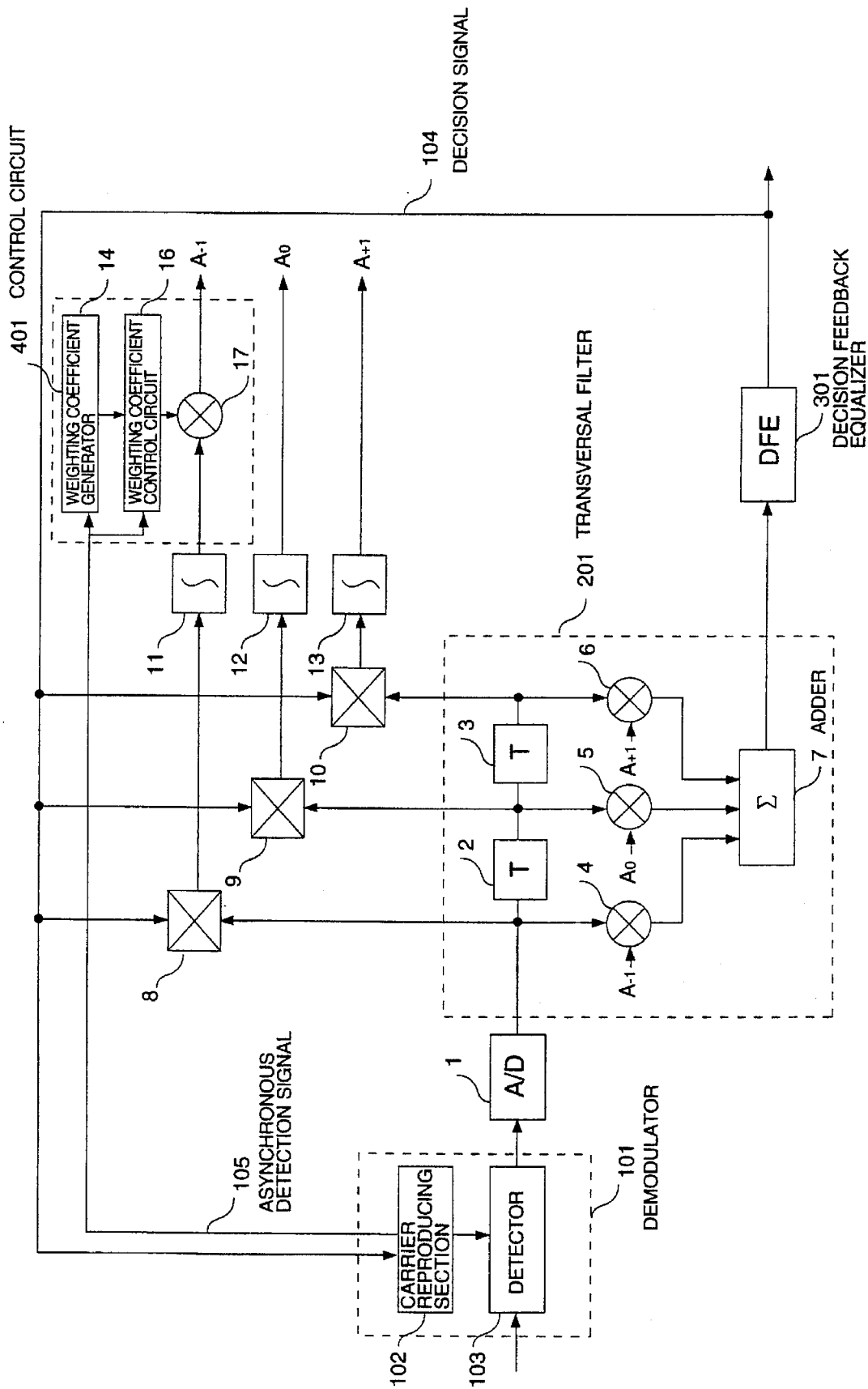
FIG. 1 is a block diagram of an embodiment of an automatic equalizer of the present invention.
Figure 4:
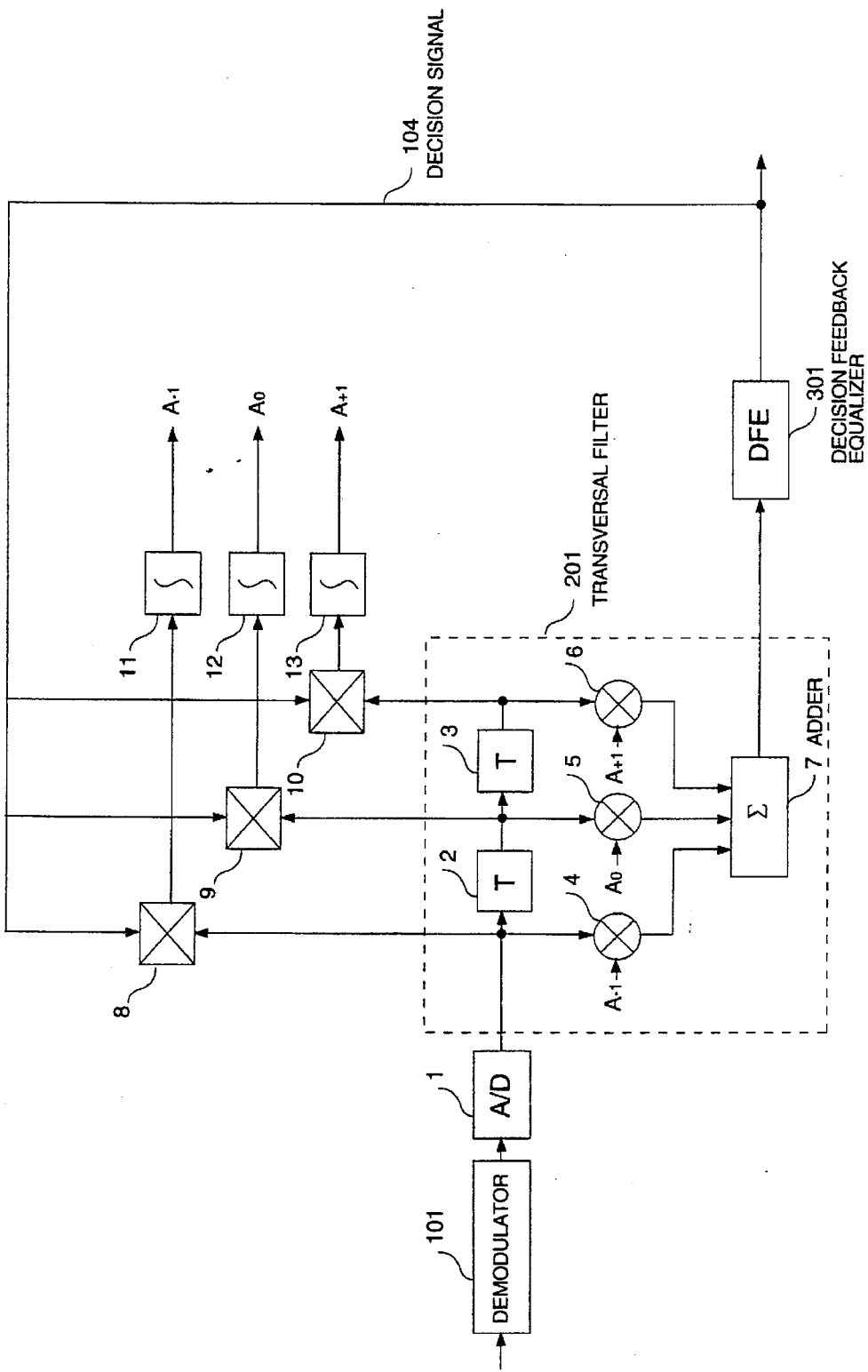
FIG. 4 is a block diagram of a first conventional prior art automatic equalizer.
Figure 5:
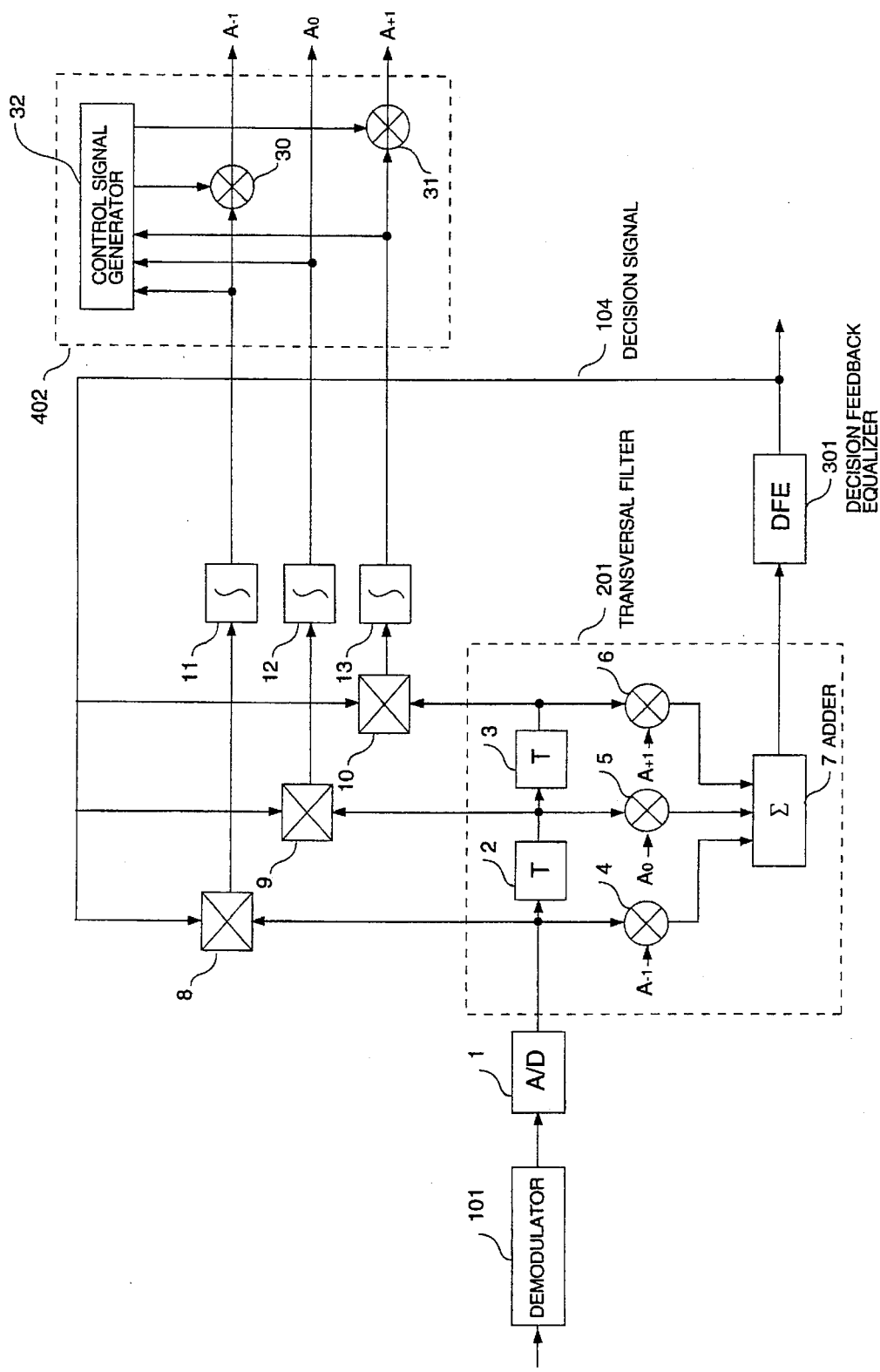
FIG. 5 is a block diagram of a second conventional prior art automatic equalizer.
Figure 6:
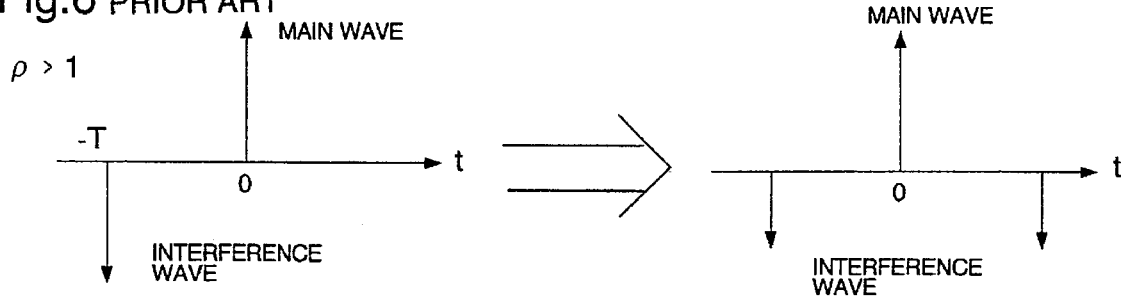
FIG. 6 is an explanatory view of an operation of an adaptive matched filter of the first conventional automatic equalizer of FIG. 4, where $p>1$.
Figure 7:
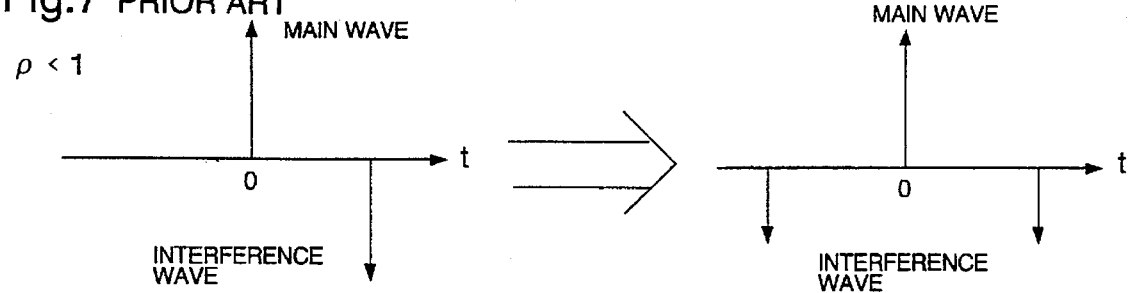
FIG. 7 is an explanatory view of an operation of the adaptive matched filter of the first conventional automatic equalizer of FIG. 5, where $p<1$.
Figure 8:
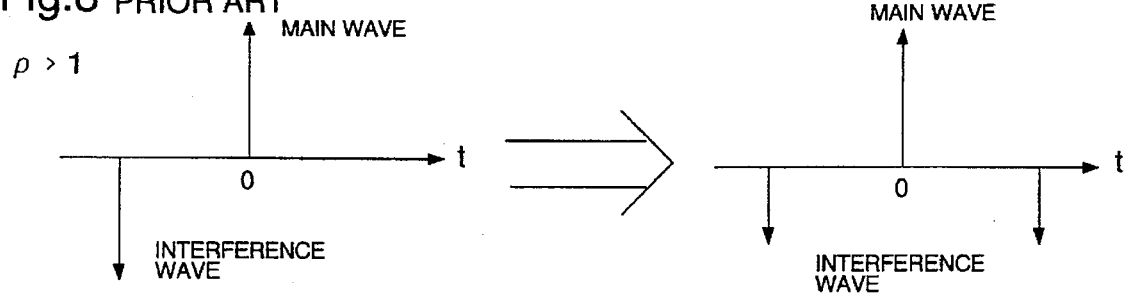
FIG. 8 is an explanatory view of an operation of the adaptive matched filter of the first conventional automatic equalizer of FIG. 5, where $p>1$.
Figure 9:
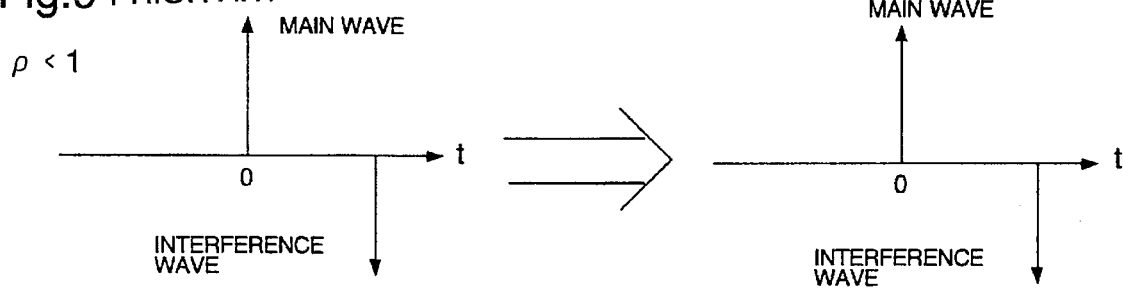
FIG. 9 is an explanatory view of an operation of the adaptive matched filter of the first conventional automatic equalizer of FIG. 5, where $p<1$.

FIG. 1 is a block diagram of an embodiment of the present invention. In FIG. 1, the same construction items as those shown by FIG. 4 have the same reference numerals, thus omitting their explanations. As FIG. 1 shows, taps of a transversal filter 201 are divided into a center tap $A_0$, minus taps $A_{-1}$ located at signal input side, and plus taps $A_{+1}$ located at signal output side.

A demodulator 101 in FIG. 1 comprises a carrier reproduction section 102 and a detector 103.

The carrier reproduction section 102 reproduces the carrier by means of decision signals and error signals output from the DFE 301. It also outputs a detection signal 105 indicating synchronous status of carrier reproduction. More specifically when the carrier reproduction is in synchronous status, the output detection signal 105 indicates synchronous status. On the contrary, when it is in asynchronous status, due to divergence in the carrier reproduction loop, the detection signal 105 indicates the asynchronous status.

The detector 103 demodulates the reproduced carrier output from the carrier reproduction section 102 and output an analog base band signal to A/D converter 1.

A control circuit 401 comprises a weighting coefficient generator 14, a weighting coefficient control circuit 16, and a multiplier 17.

The detection signal 105 output from the carrier reproduction section 102 is input to the weighting coefficient generator 14. In case the detection signal 105 indicates the synchronous status, it outputs the weighting coefficient 0. While in case the detection signal 105 indicates asynchronous status, it outputs the weighting coefficient 1.

The weighting coefficient control circuit 16 controls weighting coefficients output from the weighting coefficient generator 14 based on the detection signal 105.

Figure 2:
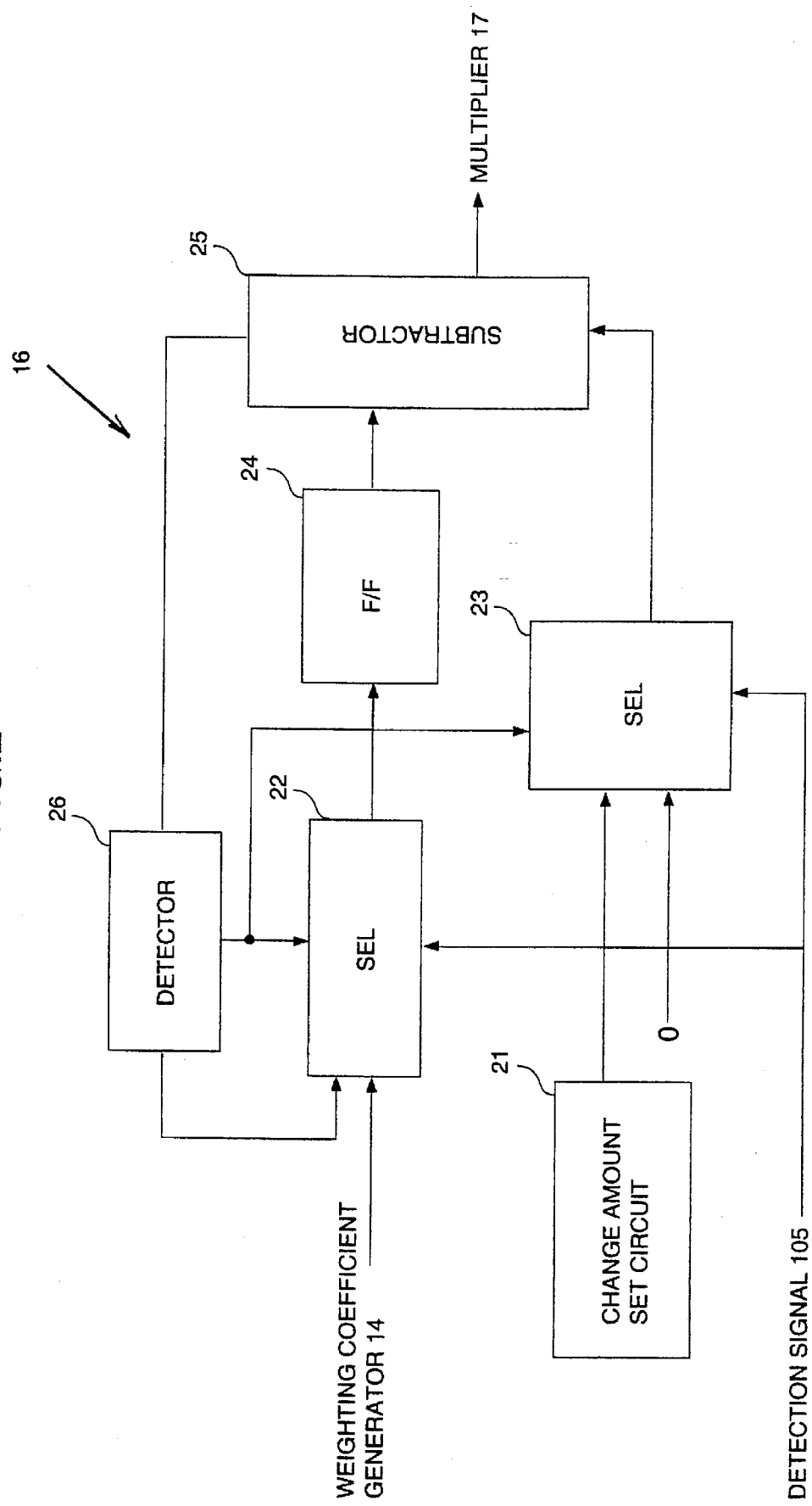
FIG. 2 is a block diagram of a weighting coefficient control circuit.

FIG. 2 is a block diagram of the weighting coefficient control circuit 16.

Referring to FIG. 2, a reference numeral 21 is a change amount set circuit, 22 and 23 are selectors, 24 is a flip-flop, 25 is a subtracter, and 26 is a detector.

In the change amount set circuit 21, change amount of the weighting coefficient is so set that the rate at which the weighting coefficient decreases from 1 to 0 is lower than the tracking rate of the DFE 301 control accompanied with the change in the status of the demodulator 101 from asynchronous to synchronous.

The selector 22 receives a weighting coefficient output from the weighting coefficient generator 14 and a feedback value from the subtracter 25. In case the detection signal 105 indicates the synchronous status, the feedback value from the subtracter 25 is selected to be output. In case it indicates asynchronous status, the weighting coefficient output from the weighting coefficient generator 14 is selected to be output.

The selector 23 receives a change amount output from the change amount set circuit 21 and a value 0. In case the detection signal 105 indicates synchronous status, the change amount output from the change amount set circuit 21 is selected to be output. In case it indicates asynchronous status, the value 0 is selected to be output.

The flip-flop 24 retains the value output from the selector 22, and outputs it upon receiving the next value.

The subtracter 25 subtracts an output value of the selector 22 from that of the flip-flop 24.

The detector 26 monitors the feedback value from the subtracter 25. In case the feedback value is 0, it outputs a detection signal to the selector 22 to cause the weighting coefficient generator 14 to output the weighting coefficient and outputs a detection signal to the selector 23 to output the value 0.

The multiplier 17 multiplies an output of the correlator 11 by the output of the weighting coefficient control circuit 16 and output a result as a coefficient of the tap $A_{-1}$.

An operation of the above-constructed automatic equalizer is explained.

Assuming that the demodulator causes synchronization step out due to divergence of the carrier reproduction loop, the carrier reproduction section 102 outputs a detection signal 105 indicating asynchronous status to the weighting coefficient generator 14 and the weighting coefficient control circuit 16.

Upon receiving the detection signal 105, the weighting coefficient generator 14 outputs the weighting coefficient 1.

While, the selector 22 that receives the detection signal 105 selects the weighting coefficient 1 output from the weighting coefficient generator 14 to be output. The selector 23 selects 0 to be output to the subtracter 25.

Then the subtracter 25 subtracts 0 from the weighting coefficient 1 that has been input via the flip-flop 24. It outputs the resultant weighting coefficient 1.

The multiplier 17 multiplies the weighting coefficient 1 by an output of the correlator 11. The resultant value is output as the coefficient of the tap $A_{-1}$.

When the detection signal 105 indicates asynchronous status, the weighting coefficient 1 is output to make the tap $A_{-1}$ of the AMF active.

Next, assuming that the demodulator currently in asynchronous status changes into the synchronous status, the carrier reproduction section 102 outputs a detection signal 105 indicating synchronous status to the weighting coefficient generator 14 and the weighting coefficient control circuit 16.

Upon receiving the detection signal 105, the weighting coefficient generator 14 outputs the weighting coefficient 0.

While, the selector 22 that has received the detection signal 105 selects the feedback value from the subtracter 25 (Since the flip-flop 24 retains the value 1, the initial value is derived form subtracting the change amount from 1, i.e., 1−change amount.), and outputs it.

The selector 23 selects the change amount output from the change amount set circuit 21 to be output to the subtracter 25.

Figure 3:
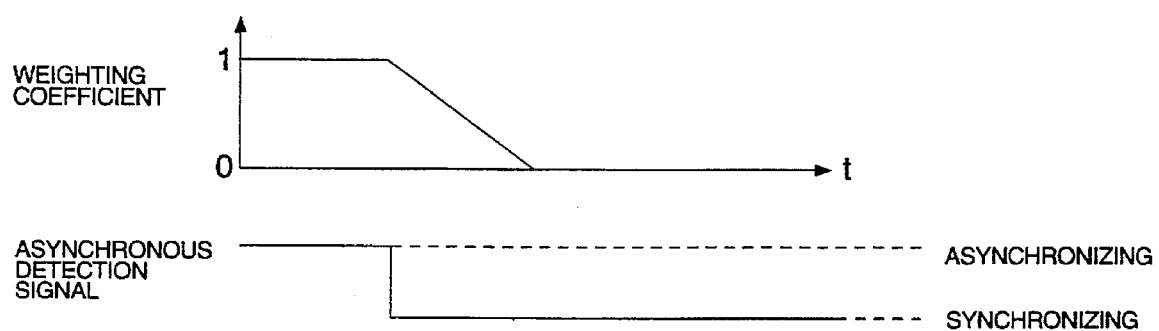
FIG. 3 is an explanatory view of an operation of the weighting coefficient control circuit.

The subtracter 25 subtracts the change amount from the input value via the flip-flop 24. That is, the output value decreases by the change amount at every subtraction. The rate required for the change is lower than the tracking rate of the DFE 301 control. FIG. 3 shows how this change has been done.

The multiplier 17 multiplies the output value of the correlator 11 by the weighting coefficient to be output as the coefficient of the tap $A_{-1}$. When the feedback value from the subtracter 25 reaches 0, the detector 26 outputs detection signals to the selectors 22 and 23. The selector 22 selects the output of the weighting coefficient generator 14, i.e., 1, and the selector 23 selects 0 to be output, respectively.

Then, the subtracter 25 subtracts the value 0 that is output by the weighting coefficient generator 14 from the value 0 that is output by the selector 23, i.e. "0".

When indication of the detection signal 105 changes into synchronous status from asynchronous status, the weighting coefficient is decreased from 1 to 0 at a rate lower than the tracking rate of the DFE 301 control, the operation of tap $A_{-1}$ of the AMF is stoped.

With the above mechanism, the equalization characteristic is improved with the effect of the AMF tap $A_{+1}$ in case of ρ>1. In addition almost the same equalization characteristic as that of the DFE unity can be obtained in case of ρ<1.

When the control loop is in divergence, pull-in property is improved by operating all taps of the AMF. Once the control loop has been pulled-in, the tap coefficient of the AMF tap $A_{-1}$ is gradually decreased at a rate lower than the tracking rate of the DFE control. It is further decreased to 0, i.e., the AMF is suspended, thus entering normal equalization operation.

The above explanation relates to a transversal filter of 3 tap type as a simple example. However, it is obvious to be able to form a transversal filter using a plurality of taps. That is, the present invention is realized by controlling all the minus taps to the center tap using an asynchronous detection signal from the demodulator in the same manner as described with respect to this embodiment.

According to the present invention as described above, all taps of the AMF are operated while the control loop is pulled-in. Once the control loop has been pulled-in, a tap coefficient for the minus tap of the AMF is gradually decreased at a rate lower than the tracking rate of the DFE control to stop operation of the AMF. The above construction realizes the automatic equalizer with excellent equalization characteristic and improved pull-in property for the control loop under fading on the propagation path status either in $\rho>1$ or $\rho<1$.

What is claimed is:

1. An automatic equalizer comprising:

a demodulator for outputting a detection signal which indicates synchronous status as well as demodulating analog base band signals from received signals;

an analog to digital converter for converting said analog base band signals to a first digital signal string by sample-quantizing said analog base band signals;

an adaptive matched filter for converting said first digital signal string to a second digital signal string;

a decision feedback equalizer for equalizing intersymbol interferences in said second digital signal string and outputting a decision signal as an equalized result;

a plurality of correlators, each of said correlators for correlating said decision signal with a signal on each tap of said adaptive matched filter;

a plurality of integrators, each of said integrators for averaging outputs of a correlator; and a control means for multiplying an output of an integrator by a weighting coefficient based on said detection signal and outputting a result for each tap coefficient of said adaptive matched filter, for multiplying outputs of said integrators corresponding to minus taps located in an input side from a center tap of said adaptive matched filter by a weighted coefficient 0 when said detection signal indicates synchronous status, for multiplying outputs of said integrators corresponding to said minus taps by a weighting coefficient 1 when said detection signal indicates asynchronous status, and for gradually decreasing a weighting coefficient from 1 to 0 at a rate lower than the tracking rate of said decision feedback equalizer when indication of said detection signal changes to said synchronous status from said asynchronous status;

said control means including a first selector and a second selector, each of said first and second selectors for switching output based on said detection signal, a flip-flop connected with said first selector, and a subtracter for subtracting an output of said second selector from an output of said flip-flop, said subtracter having an output, wherein:

said first selector inputs said output of said subtracter and said output of a weighting coefficient generator, said first selector selects an output of said weighting coefficient generator when said detection signal indicates said synchronous status, and selects an output of said subtracter when said detection signal indicates said asynchronous status; and said second selector inputs a tap coefficient change amount and a value 0, selects said value 0 when said detection signal indicates said synchronous status, and selects said tap coefficient change amount when said detection signal indicates said asynchronous status.

2. The automatic equalizer of claim 1, wherein said tap coefficient change amount can be set optionally.

3. An automatic equalizer comprising:

a demodulator for outputting a detection signal which indicates synchronous status as well as demodulating analog base band signals from received signals;

an analog to digital converter for converting said analog base band signals to a first digital signal string by sample-quantizing said analog base band signals;

an adaptive matched filter comprising a transversal filter having a center tap, a plurality of minus taps located in an input side from said center tap and a plurality of plus taps located in an output side from said center tap, said adaptive matched filter for converting said first digital signal string to a second digital signal string;

a decision feedback equalizer for equalizing intersymbol interferences in said second digital signal string and outputting a decision signal as an equalized result;

a plurality of correlators, each of said correlators for correlating said decision signal with a signal on each tap of said adaptive matched filter;

a plurality of integrators, each of said integrators for averaging outputs of said correlator; and a control means for multiplying outputs of said integrators corresponding to said minus taps by a weighting coefficient 0 when said detection signal indicates said synchronous status, multiplying outputs of said integrators corresponding to said minus taps by a weighting coefficient 1 when said detection signal indicates a asynchronous status, and gradually decreasing a weighting coefficient from 1 to 0 at a rate lower than the tracking rate of said decision feedback equalizer when indication of said detection signal changes to said synchronous status from said asynchronous status;

the control means including:

a weighting coefficient generator for inputting said detection signal, said weighting coefficient having an output outputting said weighting coefficient 0 when said detection signal indicates said synchronous status and outputting said weighting coefficient 1 when said detection signal indicates said asynchronous status;

a first selector and a second selector, each of them for switching an output based on said detection signal;

a flip-flop connected with said first selector;

a subtracter for subtracting an output of said second selector from an output of said flip-flop, said subtractor having an output; and a plurality of multipliers, each of said multipliers for multiplying outputs of said integrators corresponding to said minus taps by an output of said subtracter, wherein:

said first selector inputs said output of said subtracter and said output of said weighting coefficient generator, selects an output of said weighting coefficient generator when said detection signal indicates said synchronous status, and selects said output of said subtracter when said detection signal indicates said asynchronous status; and said second selector inputs a tap coefficient change amount and a value 0, selects said value 0 when said detection signal indicates said asynchronous status, and selects said tap coefficient change amount when said detection signal indicates said asynchronous status.

4. The automatic equalizer of claim 3, wherein said tap coefficient change amount can be set optionally.

* * * * *